(12) United States Patent
Yoshimura

(10) Patent No.: US 8,717,263 B2
(45) Date of Patent: May 6, 2014

(54) LCD UNIT, LCD APPARATUS, AND METHOD OF SETTING DRIVE VOLTAGE OF LCD UNIT

(75) Inventor: Atsushi Yoshimura, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 1315 days.

(21) Appl. No.: 11/783,148

(22) Filed: Apr. 6, 2007

(65) Prior Publication Data

US 2007/0247404 A1 Oct. 25, 2007

(30) Foreign Application Priority Data

Apr. 24, 2006 (JP) ................................. 2006-119887

(51) Int. Cl.
*G09G 3/36* (2006.01)

(52) U.S. Cl.
USPC .................. 345/87; 345/30; 345/31; 345/38; 345/39; 345/40; 345/50; 345/46; 345/55; 345/63; 345/77; 345/84; 345/903

(58) Field of Classification Search
USPC ........ 345/1, 903, 30–104; 348/383, 787, 779; 349/73, 109, 152, 158
See application file for complete search history.

(56) References Cited

U.S. PATENT DOCUMENTS

| 5,805,117 A | 9/1998 | Mazurek et al. ................. 345/1 |
| 6,149,063 A * | 11/2000 | Reynolds et al. ........ 235/472.02 |
| 6,496,177 B1 | 12/2002 | Burton ........................... 345/101 |
| 7,633,145 B2 * | 12/2009 | Arai et al. ...................... 257/679 |
| 2009/0220827 A1 * | 9/2009 | Knaggs et al. .................. 429/13 |

FOREIGN PATENT DOCUMENTS

| JP | 2001-238233 | 8/2001 |
| JP | 2002-36911 | 2/2002 |
| JP | 2002-207203 | 7/2002 |

OTHER PUBLICATIONS

Office Action from the Swedish Patent Office mailed Jan. 18, 2008 (4 pages).
Japanese Office Action received in counterpart application No. 2006-119887 dated Jun. 29, 2011 with English translation (6 pages).

* cited by examiner

*Primary Examiner* — Lun Yi Lao
*Assistant Examiner* — Olga Merkoulova
(74) *Attorney, Agent, or Firm* — Kratz, Quintos & Hanson, LLP

(57) ABSTRACT

The present invention is to provide an LCD unit, an LCD apparatus, and a method of setting a drive voltage of the LCD unit with a simple operation. The LCD unit includes a label pasted on a place of the LCD unit, wherein the label includes an information code, which is information-coded from a data of a drive voltage for achieving the best contrast in optical characteristics of the LCD unit. The best drive voltage to drive the LCD unit with the best contrast is thereby easily set.

4 Claims, 8 Drawing Sheets

FIG. 3

| COMMAND REGISTER OF ELECTRONIC VOLUME | | | OUTPUT RANGE OF DRIVE VOLTAGE (V) | CALCUCATING FORMULA OF DRIVE VOLTAGE BY ELECTRONIC VOLUME (V) ($\alpha = 0 \sim 127$) |
|---|---|---|---|---|
| D2 | D1 | D0 | | |
| 0 | 0 | 0 | 10.49~17.35 | $10.489 + 0.054 \times \alpha$ |
| 0 | 0 | 1 | 10.97~18.21 | $10.966 + 0.057 \times \alpha$ |
| 0 | 1 | 0 | 11.49~19.05 | $11.488 + 0.060 \times \alpha$ |
| 0 | 1 | 1 | 12.06~20.00 | $12.063 + 0.063 \times \alpha$ |
| 1 | 0 | 0 | 12.70~21.08 | $12.697 + 0.066 \times \alpha$ |
| 1 | 0 | 1 | 13.40~22.17 | $13.403 + 0.069 \times \alpha$ |
| 1 | 1 | 0 | 14.19~23.59 | $14.191 + 0.074 \times \alpha$ |
| 1 | 1 | 1 | 15.08~24.98 | $15.078 + 0.078 \times \alpha$ |

| D6 | D5 | D4 | D3 | D2 | D1 | D0 | α | DRIVE VOLTAGE |
|---|---|---|---|---|---|---|---|---|
| 0 | 0 | 0 | 0 | 0 | 0 | 0 | 0 | SMALL ↑ |
| 0 | 0 | 0 | 0 | 0 | 0 | 1 | 1 | |
| 0 | 0 | 0 | 0 | 0 | 1 | 0 | 2 | |
| ⋮ | | | | | | | ⋮ | |
| 1 | 1 | 1 | 1 | 1 | 0 | 1 | 125 | |
| 1 | 1 | 1 | 1 | 1 | 1 | 0 | 126 | ↓ |
| 1 | 1 | 1 | 1 | 1 | 1 | 1 | 127 | LARGE |

FIG. 8
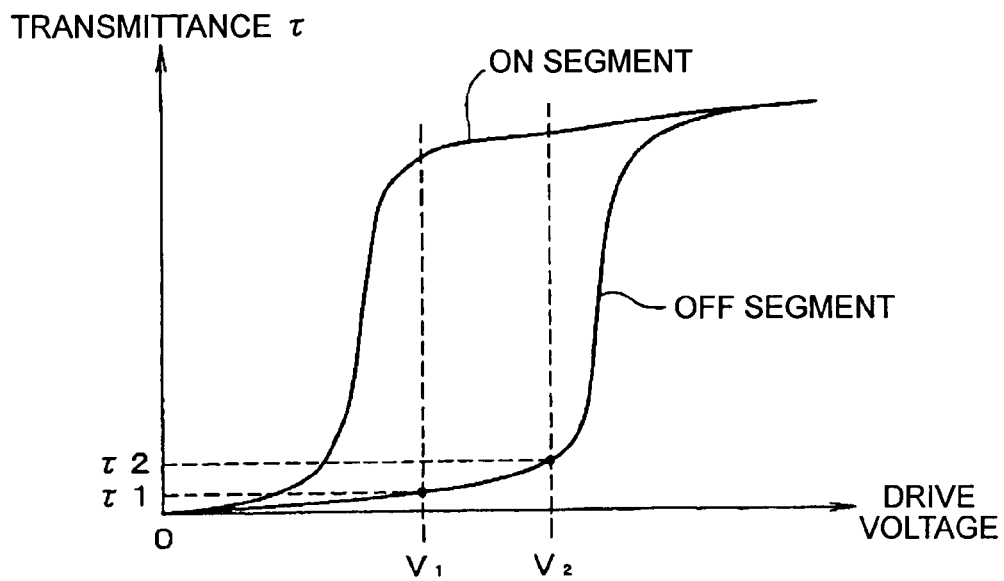
FIG. 9
| TRANSMITTANCE τ OF OFF SEGMENT | CR<40 | 40≦CR≦50 | CR>50 |
|---|---|---|---|
| τ≦0.4% | A | B | C |
| τ>0.4% | D | E | F |
FIG. 10
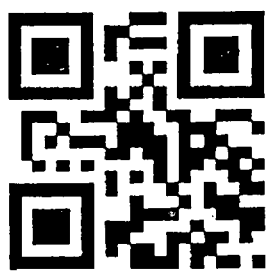

LCD UNIT, LCD APPARATUS, AND METHOD OF SETTING DRIVE VOLTAGE OF LCD UNIT

BACKGROUND OF THE INVENTION

1. Field of the Invention

The present invention relates to an LCD unit, an LCD apparatus, and a method of setting a drive voltage of the LCD unit.

2. Description of Related Art

An in-car display apparatus utilizing an LCD (Liquid Crystal Display) apparatus is mounted in a motor vehicle, for example JP-2002-36911-A. It is necessary to drive the LCD apparatus with a drive voltage for achieving the best display.

In a conventional method, a data of a drive voltage, which provides the best display or the best contrast, of an LCD apparatus utilized in an in-car display apparatus is manually inputted to a memory device of the in-car display apparatus by means of a setting device or a microcomputer when manufacturing the in-car display apparatus. The drive voltage is usually referred to a specification of the LCD unit.

A plurality of the LCD units utilized in the in-car display apparatus have a variety of the drive voltages for achieving the respective best displays or the respective best contrasts. When the plurality of the LCD units are operated with a same voltage, the LCD units result in non-uniform appearances on each screen about contrast and color.

SUMMARY OF THE INVENTION

An object of the present invention is to provide an LCD unit, an LCD apparatus, and a method of setting a drive voltage of the LCD unit with a simple operation.

According to a first aspect of the present invention, an LCD unit includes a label pasted on a place of the LCD unit, wherein the label includes an information code, which is information-coded from a data of a drive voltage to achieve the best contrast in optical characteristics of the LCD unit.

According to a second aspect of the present invention, an LCD apparatus includes at least one LCD unit as claimed in claim 1; at least one LCD driver device for driving the LCD unit; a control device for controlling the LCD driver device; and a setting device for setting the drive voltage to achieve the best contrast of the LCD unit based on the data read from the information code included in the label.

Preferably, the LCD driver device includes an electronic volume and the data is a set value of the electronic volume for setting the drive voltage to achieve the best contrast.

According to a third aspect of the present invention, a method of setting a drive voltage of an LCD unit, includes the steps of: pasting a label on a place of the LCD unit, the label including an information code, which is information-coded from a data of the drive voltage to achieve the best contrast in optical characteristics of the LCD unit (pasting step); reading the data from the information code included in the label (reading step); and setting the drive voltage to achieve the best contrast based on the data read (setting step).

According to a fourth aspect of the present invention, a method of setting drive voltages of a plurality of LCD units of an in-car display apparatus, includes the steps of: pasting a label on a place of each LCD unit, the each label including an information code, which is information-coded from a data of the drive voltage to achieve the best contrast in optical characteristics of the associated LCD unit (pasting step); grouping the plurality of the LCD units into a plurality of groups based on the best contrast and a transmittance of an OFF segment for optical characteristics of the respective LCD units (grouping step); selecting the plurality of the LCD units in the same group among the plurality of the groups (selecting step); mounting the LCD units selected to the in-car display apparatus (mounting step); reading the data of the drive voltage to achieve the best contrast from the information code included in the each label (reading step); and setting the drive voltage to achieve the best contrast based on the data read (setting step).

According to a fifth aspect of the present invention, a method of setting a drive voltage of an LCD unit, includes the steps of: measuring optical characteristics of the LCD unit (measuring step); evaluating a set value of an electronic volume for setting the drive voltage to achieve the best contrast (evaluating step); coding the evaluated set value of the electronic volume into an information code (coding step); pasting a label including the information code on a place of the LCD unit (pasting step); reading the set value of the electronic volume from the information code included in the label (reading step); and correcting a previously stored default set value of the electronic volume with the set value of the electronic volume read by the reading step (correcting step).

According to a sixth aspect of the present invention, a method of setting drive voltages of a plurality of LCD units of an in-car display apparatus, includes the steps of: measuring optical characteristics of a large number of LCD units for selecting the plurality of the LCD units (measuring step); evaluating a set value of an electronic volume for setting the drive voltage to achieve the best contrast of the each LCD unit (evaluating step); coding the set value of the electronic volume evaluated into an information code for the each LCD unit (coding step); pasting a label including the information code to a place of the respective LCD units (pasting step); reading the set value of the electronic volume from the information code included in the label of the respective LCD units (reading step); and correcting a previously stored default set value of the electronic volume with the set value of the electronic volume read for the respective LCD units (correcting step).

Preferably, the method further includes the steps of: measuring further the best contrast and a transmittance of an OFF segment of the respective LCD units at the measuring step (measuring step); grouping the plurality of the LCD units into a plurality of groups based on the best contrasts and the transmittances of the OFF segments measured (grouping step); and coding the data of the best contrast and a name of the group into an information code for the each LCD unit (coding step); and pasting the label including the information code on a place of the respective LCD units (pasting step).

Preferably, the method further includes the step of matching a chromaticity of ON segments of the plurality of the LCD units by setting the drive voltages for achieving the best contrast thereof.

Preferably, the measuring step further comprises the step of measuring a luminance of the ON segment at the best contrast; the pasting step further comprises the step of coding the luminance of the ON segment evaluated at the evaluating step; the reading step further comprises the step of reading the luminance of the ON segment from the information code included in the label of the each LCD unit; and the correcting step further comprises a fixed-valued correction step by reducing the corrected set values of the electronic volumes of the LCD units, which have the luminances of the ON segments equal to or more than the prescribed threshold value compared with the LCD units with lower luminances, by the prescribed fixed value.

BRIEF DESCRIPTION OF THE DRAWINGS

FIG. 3 shows a calculating formula of the drive voltages of the LCD driver devices of FIG. 2;

FIG. 8 shows characteristics of transmittances of ON segment and OFF segment of the LCD unit against the drive voltage;

FIG. 9 shows groups grouped with respect to the transmittances of the OFF segments and the best contrasts;

FIG. 10 is an example of QR Codes;

DETAILED DESCRIPTION OF THE PREFERRED EMBODIMENTS

Figure 1:
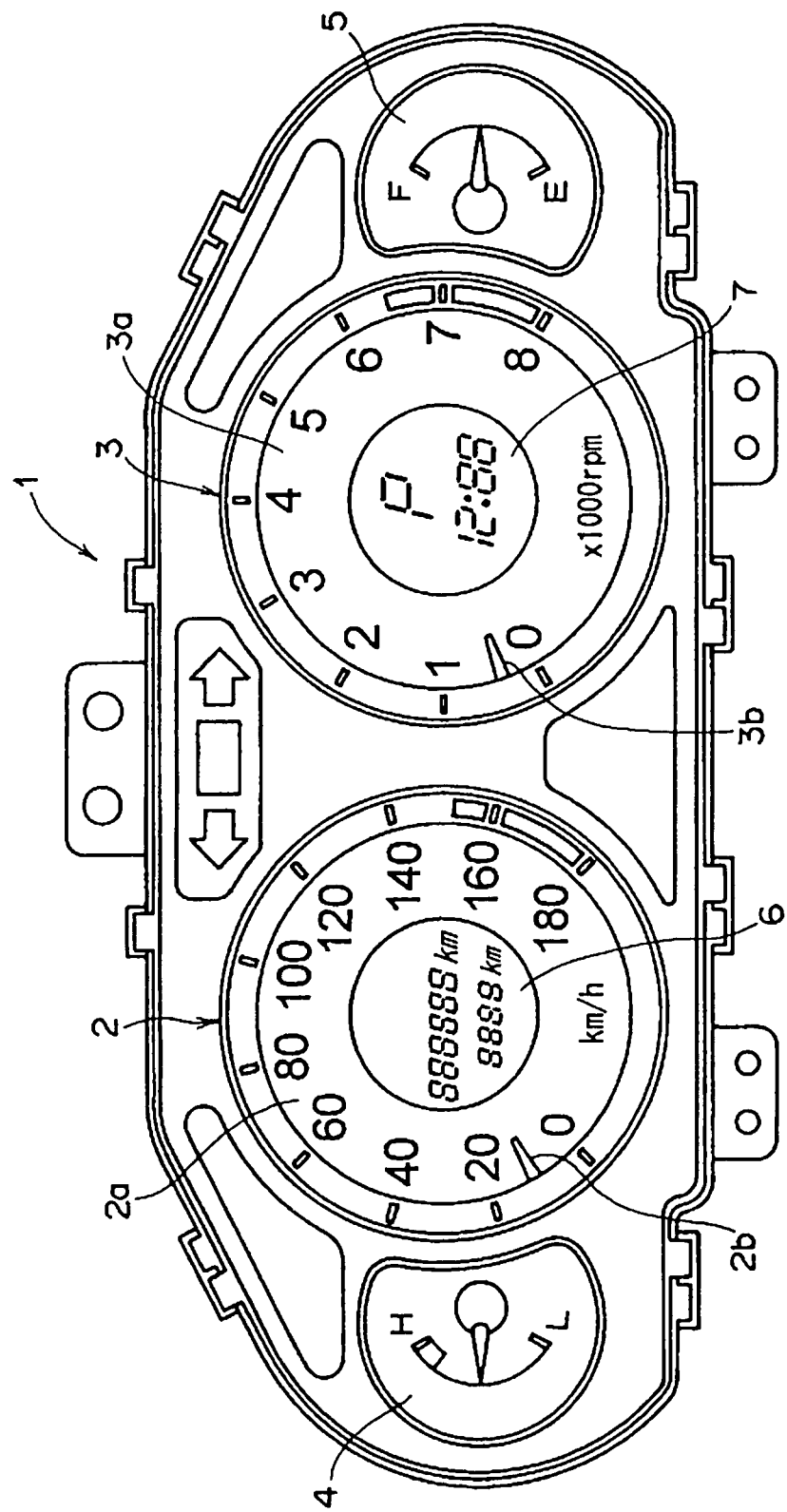
FIG. 1 is a front view of an in-car display apparatus including LCD apparatuses utilizing an embodiment of LCD units set by a method of setting drive voltages.

An embodiment of the present invention is explained by referring to the drawings.

FIG. 1 is a front view of an in-car display apparatus including LCD apparatuses for which a drive voltage is set. The in-car display apparatus 1 includes a speedometer 2, a tachometer 3, a heat gauge 4, a fuel gauge 5, and two LCD units 6 and 7. The speedometer 2 has an indicator 2b appearing near to a circumference of a dial plate 2a for indicating a numerical scale on the dial plate 2a. The LCD unit 6 is disposed on an opening at the center of the dial plate 2a for displaying a display screen. The tachometer 3 has an indicator 3b appearing near to a circumference of a dial plate 3a for indicating a numerical scale on the dial plate 3a. The LCD unit 7 is disposed on a opening at the center of the dial plate 3a for displaying a display screen.

Figure 2:
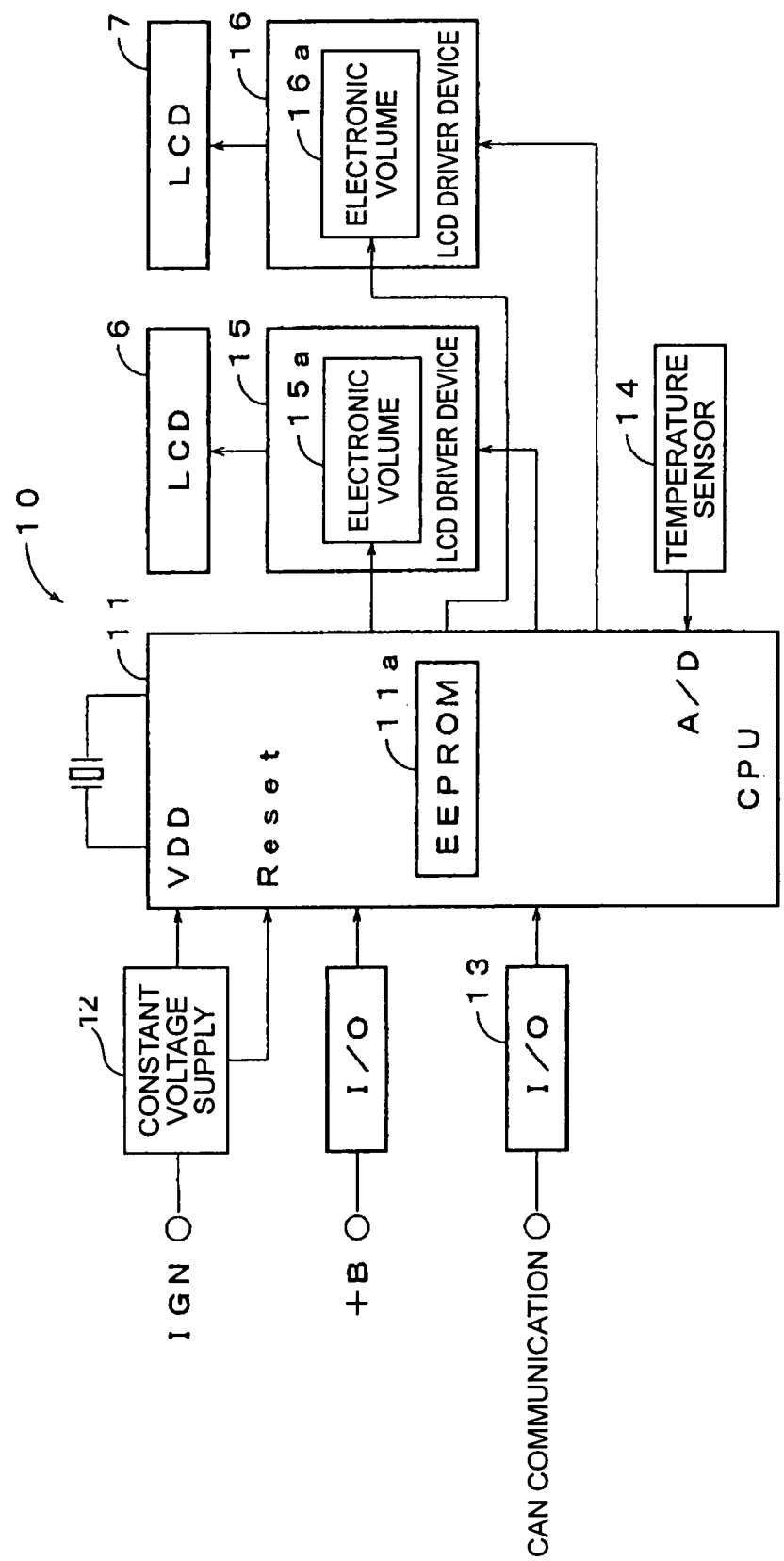
FIG. 2 is a block diagram of a drive circuit to drive the LCD units of the in-car display apparatus of FIG. 1.

FIG. 2 shows a block diagram of a drive circuit 10 to drive the LCD units 6 and 7 of the in-car display apparatus 1. The drive circuit 10 includes a control device, or a microcomputer (CPU) 11 to control a whole operation, a constant voltage supply 12 to supply a suitable voltage to the CPU 11 via an ignition switch (IGN), an input/output (I/O) circuit 13, through which an image data displayed on the LCD units 6 and 7 is inputted with a CAN (Controller Area Network) communication, a temperature sensor 14 to detect ambient temperature, an LCD driver device 15 to drive the LCD unit 6, and an LCD driver device 16 to drive the LCD unit 7. The CPU 11 has an EEPROM 11a as a memory device. The LCD driver devices 15 and 16 accept the image data from the CPU 11 and include electronic volumes 15a and 16a as setting devices to set the drive voltages.

The drive voltages of the LCD units 6 and 7 are selected from assigned eight states of command resisters, shown in FIG. 3, with CPU 11. An output range of the drive voltage is determined from a calculating formula including a set value α, which is assigned by the CPU 11, of the respective electronic volumes 15a and 16a.

Figures 4, 5:
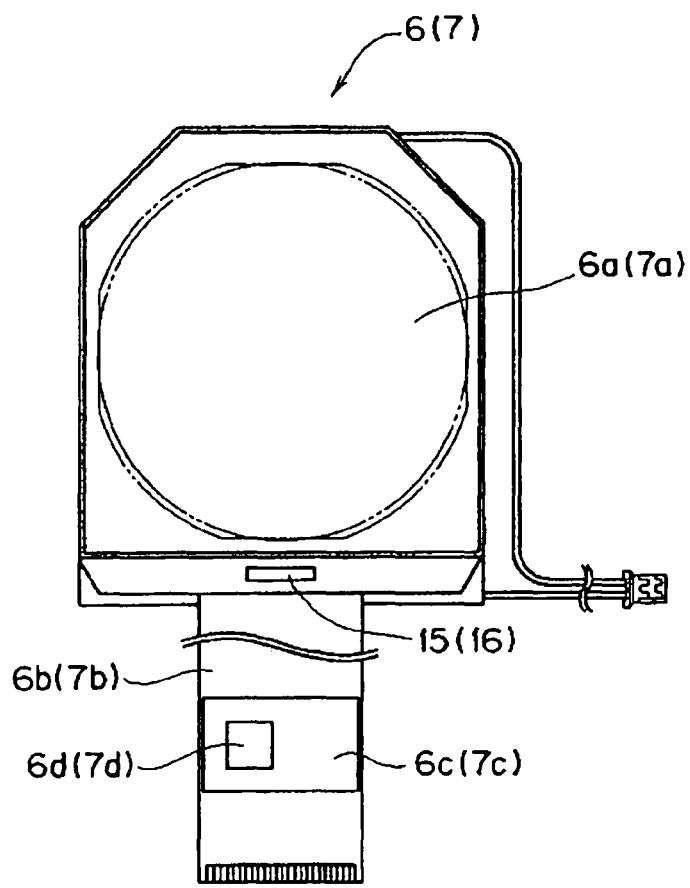
FIG. 4 illustrates set values α of an electronic volume utilized in the calculating formula of FIG. 3.
FIG. 5 is a schematic diagram of a configuration of the LCD unit of the in-car display apparatus of FIG. 1.

The set value α is a value of the command register of the electronic volume. A set of 7 bits to the electronic volume register provides one of 128 states. FIG. 4 shows the set values of α for the electronic volume register.

As shown in FIG. 5, the LCD units 6 and 7 have circular display screens 6a and 7a, respectively fitting to the openings of the dial plates of the speedometer 2 and the tachometer 3. The LCD units 6 and 7, for example, have 102×102 dots. The LCD units 6 and 7 incorporate the integrated-circuit LCD driver devices 15 and 16, and FPC (Flexible Printed Circuit) 6b and 7b to communicate between the LCD driver devices 15, 16 and the CPU 11, respectively. The LCD unit 6 has the display screen 6a to show, for example, a trip meter showing an accumulative driving distance, and the LCD unit 7 has the display screen 7a to show, for example, a current time.

Figure 6:
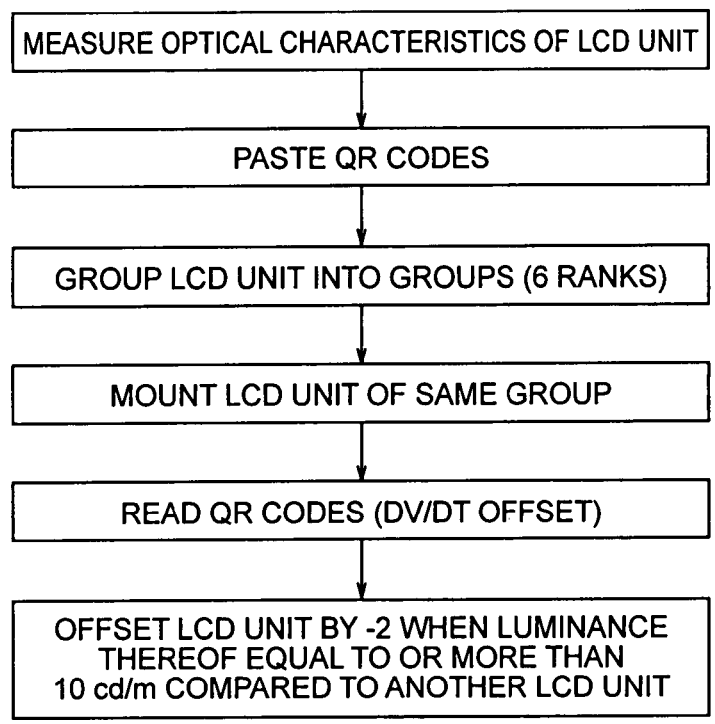
FIG. 6 is a flowchart of setting the best drive voltage of the LCD unit.

FIG. 6 shows a flowchart for setting the best drive voltage providing a similar appearance to the display screens of the LCD units 6 and 7.

(Step S1: Measuring Step) Optical characteristics of the plurality of the LCD units are measured to each obtain the best contrast CR, the set value of the electronic volume, a luminance of an ON segment, and a transmittance of an OFF segment when the best contrast CR is achieved. The ON segment is the segment selected by the LCD driver device and the OFF segment is the segment not selected by the LCD diver device.

(Step S2: Pasting Step) For each LCD unit at step S1, a data of the best contrast CR, the set value α of the electronic volume and the luminance of the ON segment is transferred into an information code with a coding device such as a personal computer having a coding software. The information code is then printed out on a label and the label is pasted on a suitable place of the LCD unit. The pasting place is, for example, a place to be read with a QR Code reading device. The information code is, for example, a two dimensional code such as the QR Codes ™, which is the embodiment of the present invention as shown in FIG. 10. As shown in FIG. 5, the labels 6c and 7c including the information codes 6d and 7d such as the QR Codes are pasted on surfaces of the FPC 6b and 7b of the LCD units 6 and 7, respectively.

(Step S3: Grouping Step) The plurality of the LCD units are then grouped into several groups, for example 6 ranks, depending on the data of the each best contrast CR and the transmittance of the OFF segment of step S1.

Figure 7:
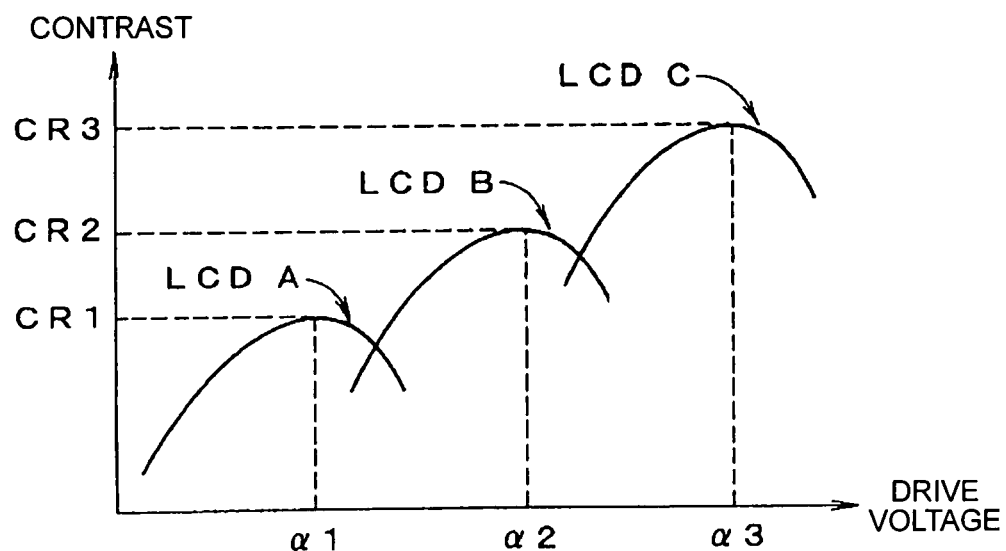
FIG. 7 shows characteristics of contrasts against the drive voltage of the LCD units.

The contrast CR of each LCD unit is generally given by a ratio of the luminance of the ON segment/the luminance of the OFF segment. The LCD units have characteristics of the contrast CR against the drive voltage, which is determined by the set value α of the electronic volume, as shown in FIG. 7. When the best contrast CRs of the respective LCD units LCD-A, LCD-B, and LCD-C are CR1<CR2<CR3, the set values of the drive voltages of the respective LCD units become α1<α2<α3. The LCD units LCD-A, B, C having the different best CRs are not adapted to the LCD units 6 and 7.

As a first step, the plurality of the LCD units manufactured are grouped about the best contrast CR into a group substantially having CR1 or a prescribed range about CR1, a group substantially having CR2 or a prescribed range about CR2, and a group substantially having CR3 or a prescribed range about CR3.

The characteristics of the transmittances τ of the ON and OFF segments against the drive voltage are given in FIG. 8. When two LCD units have the same best contrast CR with different drive voltages V1 and V2, the two LCD units have the different transmittances τ1 and τ2 of the OFF segments (luminances of OFF segments), resulting to a different appearance between the LCD units. When the two LCD units have the same contrast CR, that is the ratio of the luminance of the ON segment/the luminance of the OFF segment, for example, the LCD unit of 500/5 and the LCD unit of 100/1, they provide a different appearance responsive to the transmittance (luminance) of the OFF segment such that the higher OFF segment appears light dark and the smaller OFF segment appears dark black. It is thus necessary to make the transmittances of the OFF segments same in order to achieve the similar appearance. The transmittance of the OFF segment is calculated with a relation, transmittance of OFF segment (%)=(luminance of OFF segment/luminance of backlight)×100, when the luminance of the backlight of the LCD unit is fixed.

The plurality of the LCD units manufactured are grouped about the transmittance into a group substantially having τ1 or a prescribed range about τ1 and a group substantially having τ2 or a prescribed range about τ2.

The groups of the best CRs and the groups of the transmittances of the OFF segments are finally combined to group the LCD units. FIG. 9 shows an example of the combination group of the plurality of the LCD units with 6 groups about the transmittances τ≤0.4% and τ>0.4%, and the best CRs CR<40, 40≤CR≤50, and CR>50.

The LCD units are grouped into 6 groups A(τ≤0.4%, CR<40), B(τ≤0.4%, 40≤CR≤50), C(τ≤0.4%, CR>50), D(τ>0.4%, CR<40), E(τ>0.4%, 40≤CR≤50), F(τ>0.4%, CR>50).

(Step S4: Mounting Step) Two LCD units are selected from one of 6 groups and mounted to the in-car display apparatus 1.

(Step S5: Reading Step and Correcting Step) The QR Codes of the labels 6c and 7c pasted on the LCD units 6 and 7 are read with the QR Code reading device (not shown). The data of each best contrast CR, set value α of the electronic volume, luminance of the ON segment, and group name are inputted to the CPU 11 via the I/O circuit 13 of the CAN communication. The CPU 11 stores the data of each best CR, set value α of the electronic volume, luminance, and group name into the EEPROM 11a. The CPU 11 corrects the previously stored default set values of the electronic volumes of the drive voltage table of the two LCD units with the set values α the electronic volumes read from the QR Codes of the LCD units 6 and 7.

Figure 11:
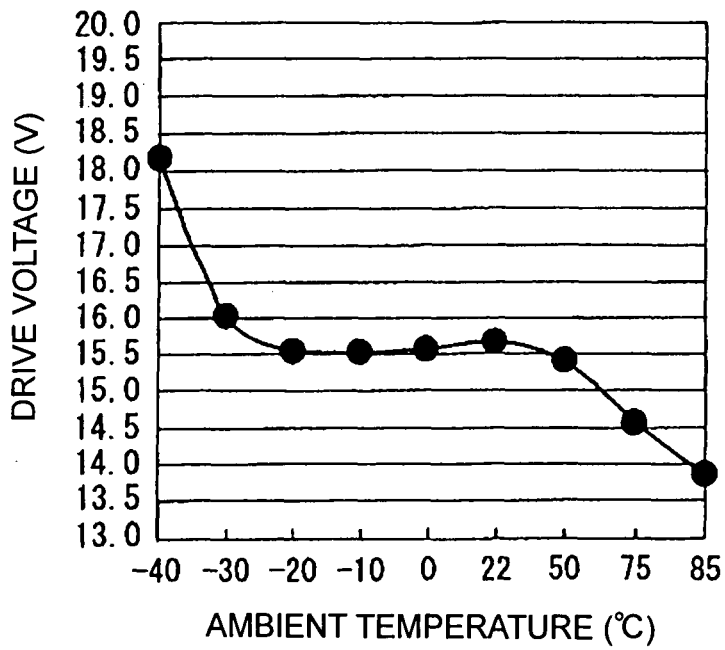
FIG. 11 shows a characteristic of the drive voltage responsive for the best contrast against ambient temperatures.

The EEPROM 11a previously stores the default values of the drive voltage table, which represents characteristics of the drive voltage to achieve the best contrast CR with respect to the ambient temperature as shown in FIG. 11. The LCD unit generally reduces the luminance at lower temperature and reduces the contrast at higher temperature so that the drive voltage is controlled to become high at the lower temperature and low at the higher temperature as depicted in FIG. 11.

The drive voltage table includes a variation of the drive voltage $V_{LCD}$ against the best contrast CR with variation of the ambient temperature. The reference of the drive voltage is the drive voltage of the best contrast CR at room temperature, for example 22° C. The set value $α_0$ of the electronic volume for the drive voltage $V_{LCD}$ is adjusted to become the drive voltage corresponding to the ambient temperature detected from the signal of the temperature sensor 14 based on the drive voltage table. The drive voltages corresponding to the best contrast CR with the change of the temperature are always supplied to the LCD units 6 and 7.

Figure 12:
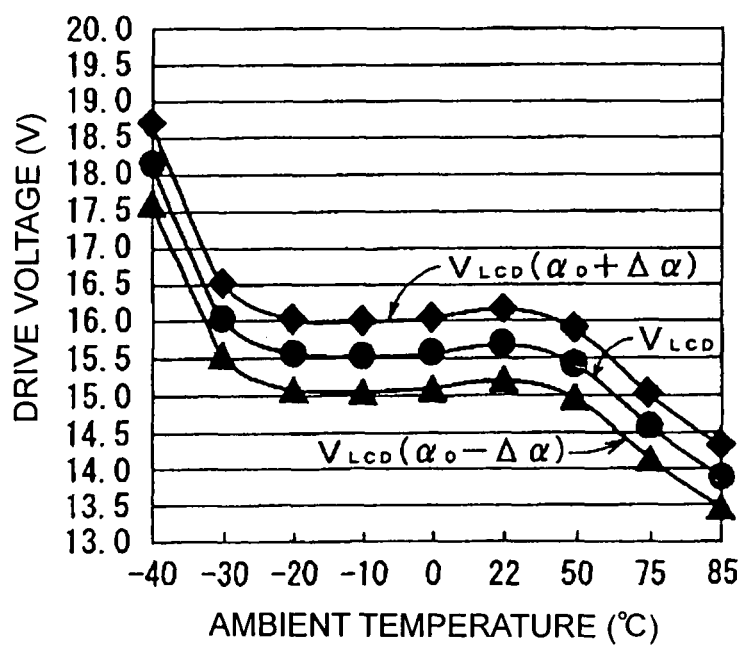
FIG. 12 shows characteristics of the drive voltages for the best contrasts against the ambient temperatures after offsetting the default drive voltages.

The CPU 11 offsets the drive voltage to be $α_0-Δα$ or $α_0+Δα$ with respect to the set value $α_0$ of the electronic volume for the default drive voltage $V_{LCD}$ as shown in FIG. 12. Δα is defined by a relation, Δα=(set value α of QR Codes)−(default set value), −Δα and +Δα mean the negative and positive values of Δα, respectively.

(Step S6: Fixed-valued Correction Step) When the difference of the luminance of the ON segments read from the QR Codes of the LCD units 6 and 7 is equal or more than a prescribed threshold value, for example 10 cd/m, of the luminance, the CPU 11 fine-adjusts the offset of the drive voltage of the LCD unit with the higher luminance to reduce by the prescribed fixed value k, for example k=−2. The drive voltage corresponds to the set value of the electronic volume with $(α_0±Δα-k)$.

When the LCD units have the large difference of the luminance and the substantially same best contrast in the same group, they show the different appearances. The fine adjustment is necessary to reduce the difference of the appearances. The offset of the drive voltage table of the LCD unit of the higher luminance is fine-adjusted to close to the luminance of the LCD unit of the lower luminance.

The chromaticity of the ON segment of the each LCD unit also varies with the drive voltage. There is the correlation between the drive voltage and the contrast, see FIG. 7, so that there is a correlation between the contrast and the chromaticities x, y, and z.

Figure 13:
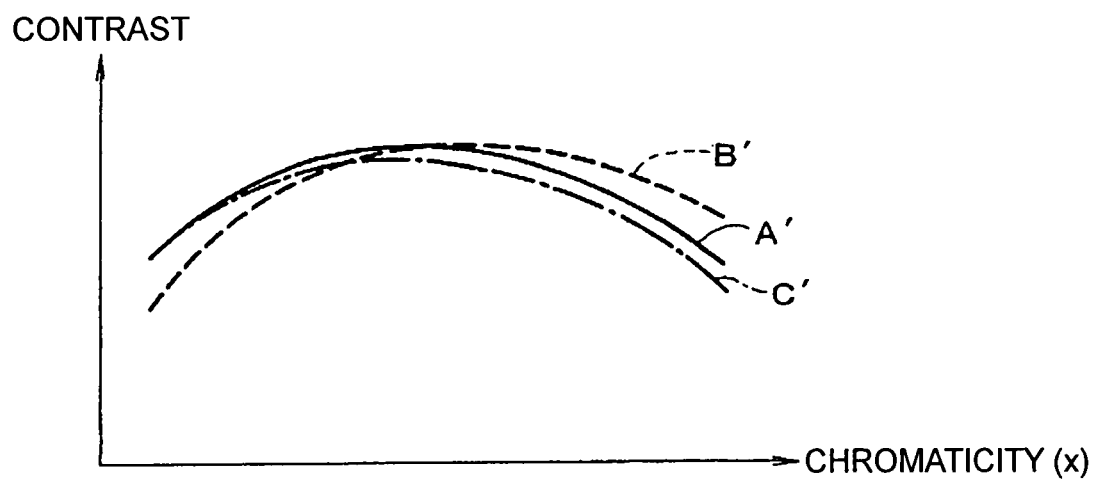
FIG. 13 shows characteristics of the contrasts against chromaticities x.

FIG. 13 shows the relation between the chromaticity x and the contrast. The contrast of each LCD unit is not constant but varies in a curve with the chromaticity x. When the LCD units A', B' and C' of the same group having substantially the same best contrast CR, apexes of the respective curves of FIG. 13, the chromaticity x corresponding to the respective best contrasts becomes almost same.

Figure 14:
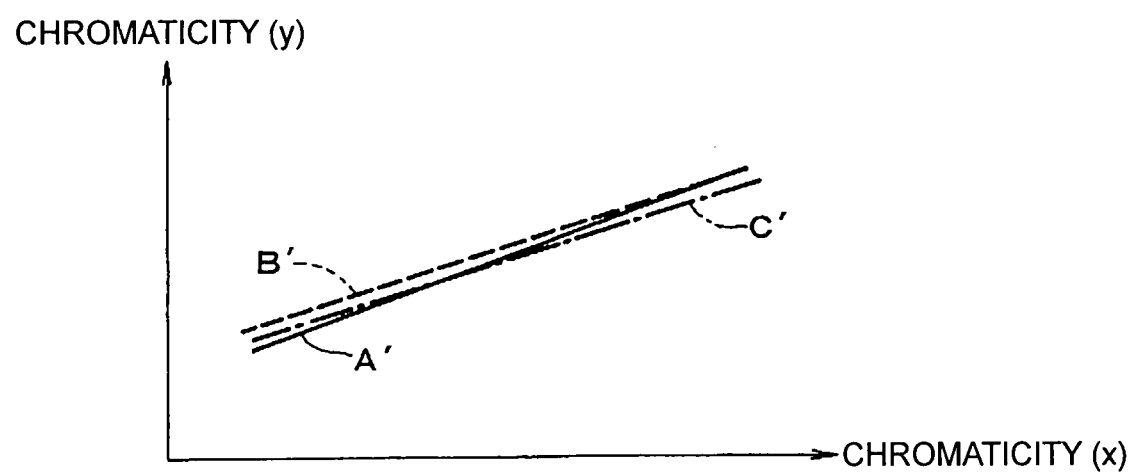
FIG. 14 shows characteristics of chromaticities y against the chromaticities x.

FIG. 14 shows a relation between the chromaticities x and y. Each chromaticity of the LCD units is not constant but varies linearly with the chromaticity x. When the LCD units A', B'and C'belong to the same group, the variations of the chromaticities y against the chromaticities x become nearly equal so that the chromaticity y at a chromaticity x is almost same for all the LCD units A', B'and C'.

When the LCD units of the same group have the substantially same best contrast, the ON segments thereof provide a matching chromaticity. The fine adjustment of the offset of the drive voltage table of the LCD unit of the higher luminance to close to the luminance of the LCD unit of the lower luminance provides a fine adjustment of color matching.

The color matching of the plurality of the LCD units of the in-car display apparatus thus becomes possible and maintains a quality of the display.

A specific example of setting the best drive voltage of the LCD units is explained below. When the default set values of the electronic volumes 15a and 16a are α1=50 and α2=50 at the prescribed ambient temperature, the QR Codes of the LCD unit 6 show the set value α1'=54 and the luminance of the ON segment=80, and the QR Codes of the LCD unit 7 show the set value α2'=59 and the luminance of the ON segment=95, α1 is offset from 50 to 54 (+4) and α2 is offset from 50 to 59 (+9). Since the difference of the luminance between the ON segments of the LCD units 6 and 7 is equal or more than 10, α2 is fine-adjusted to offset the value from 59 to 57 (−2).

The embodiment of the present invention is only exemplary and not limited thereto, and any modification and alteration are possible.

The embodiment of the present invention groups the LCD units into 6 groups. The range of the best contrast CR and the transmittance of the OFF segment can be varied to adjust the number of the groups so as to adjust the level of the color matching.

The embodiment of the present invention utilizes the two dimensional code such as the QR Codes but is not limited thereto. Other two dimensional code or the well known barcode can also be utilized.

In the embodiment of the present invention, the best contrast, the set value α of the electronic volume, the luminance of the ON segment, and the group name are information-coded. Other data such as lot number of manufacturing of the LCD units can also be information-coded. The manufacturing lot number of the LCD unit can be utilized for traceability thereof. At step S5, the group name of the LCD units 6 and 7 read is verified to be same or not, and the offset is carried out when they are same and the error message is displayed when they are different.

In the embodiment of the present invention, the fine adjustment of the offset with the fixed value −2 is performed when the difference between the luminance is equal or more than 10. The difference of the luminance and the fixed value are optionally changed.

The embodiment of the present invention is explained for two LCD units. The present invention, however, can be adapted three or more LCD units of one in-car display apparatus.

The present invention is also adapted for setting the best drive voltage to a single LCD unit of the in-car display apparatus. In this case, the flowchart of FIG. 6 is processed from step S1 to S5 and step S6 is omitted.

What is claimed is:

1. A method of setting drive voltages of a plurality of LCD units of an in-car display apparatus, comprising the steps of:
   pasting a label on a place on each particular LCD unit, the label on each particular LCD unit including an information code, which is information-coded from a data of the drive voltage to achieve the best contrast in optical characteristics of the particular LCD unit (pasting step), wherein the drive voltage is unique to the particular LCD unit and determined by using measured electronic characteristics of electronic components which are unique to the particular LCD unit;
   grouping a plurality of the particular LCD units into a plurality of groups based on the best contrast and a ratio of luminance of an OFF segment divided by luminance of backlight for optical characteristics of the respective particular LCD units (grouping step);
   selecting the plurality of the particular LCD units in the same group among the plurality of the groups (selecting step);
   mounting the particular LCD units selected to the in-car display apparatus (mounting step);
   reading the data of the drive voltage to achieve the best contrast from the information code included in the each label (reading step); and
   setting the drive voltage to achieve the best contrast based on the data read (setting step).

2. A method of setting drive voltages of a plurality of LCD units of an in-car display apparatus, comprising the steps of:
   measuring optical characteristics of a large number of particular LCD units for selecting the plurality of the LCD units (measuring step);
   evaluating a set value of an electronic volume for setting the drive voltage to achieve the best contrast of the each particular LCD unit (evaluating step), wherein the drive voltage is unique to the particular LCD unit and determined by using measured electronic characteristics of electronic components which are unique to the particular LCD unit;
   coding the set value of the electronic volume evaluated into an information code for each particular LCD unit (coding step);
   pasting a label including the information code to a place of the respective particular LCD units (pasting step);
   reading the set value of the electronic volume from the information code included in the label of the respective particular LCD units (reading step);
   correcting a previously stored default set value of the electronic volume with the set value of the electronic volume read for the respective particular LCD units (correcting step);
   measuring further the best contrast and ratio of luminance of an OFF segment divided by luminance of backlight of the respective particular LCD units (measuring step);
   a grouping the plurality of the particular LCD units into a plurality of groups based on the best contrasts and the ratio of luminance of an OFF segment divided by luminance of backlight measured (grouping step); and
   coding further the data of the best contrast and a name of the group into an information code for the each particular LCD unit (coding step).

3. The method as claimed in claim 2, further comprising the step of matching a chromaticity of ON segments of the plurality of the particular LCD units by setting the drive voltages for achieving the best contrast thereof.

4. The method as claimed in claim 2, wherein the measuring step further comprises the step of measuring a luminance of the ON segment at the best contrast;
   the coding step further comprises the step of coding the luminance of the ON segment evaluated at the evaluating step;
   the reading step further comprises the step of reading the luminance of the ON segment from the information code included in the label of each of the particular LCD unit; and
   the correcting step further comprises a fixed-valued correction step by reducing the corrected set values of the electronic volumes of each of the particular LCD units, which have the luminances of the ON segments equal to or more than the prescribed threshold value compared with each of the particular LCD units with lower luminances, by the prescribed fixed value.

* * * * *